Oct. 21, 1941.　　　　R. B. BOURNE　　　　2,260,210

VISUAL TIP FOR VIBRATING INDICATORS

Original Filed Aug. 8, 1938

INVENTOR
ROLAND B. BOURNE
BY Chapin & Neal
ATTORNEYS

Patented Oct. 21, 1941

2,260,210

UNITED STATES PATENT OFFICE 2,260,210

VISUAL TIP FOR VIBRATING INDICATORS

Roland B. Bourne, West Hartford, Conn., assignor to The Maxim Silencer Company, Hartford, Conn., a corporation of Connecticut Original application August 8, 1938, Serial No. 223,651. Divided and this application March 6, 1940, Serial No. 322,551

3 Claims. (Cl. 116—114)

The present invention relates to improvements in visual indicators of the type in which the observation depends upon the accurate detection either of variations of amplitude or the condition of maximum amplitude of oscillation of a rapidly oscillating member such for example as a vibrating reed. The use of the visual indicator of this invention has particular utility in connection with a frequency analyzer having a vibrating reed of variable length, and it will therefore be described in that environment; but it will be understood that it will also find utility in other devices, such as frequency analyzers of the multiple fixed-length reed type.

The nature of the invention can best be understood after a consideration of its utility in one particular environment, which has been chosen as the variable reed frequency analyzer described and claimed in my copending application Serial No. 223,651, filed August 8, 1938, of which the present application is a division.

Referring to the drawing.

Figure 1:
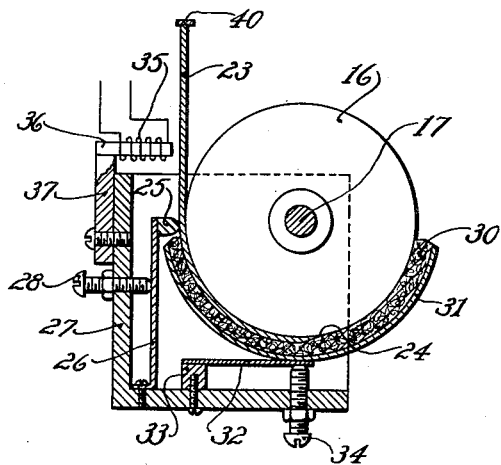
Fig. 1 is a transverse section through a preferred embodiment of the invention.
Figure 2:
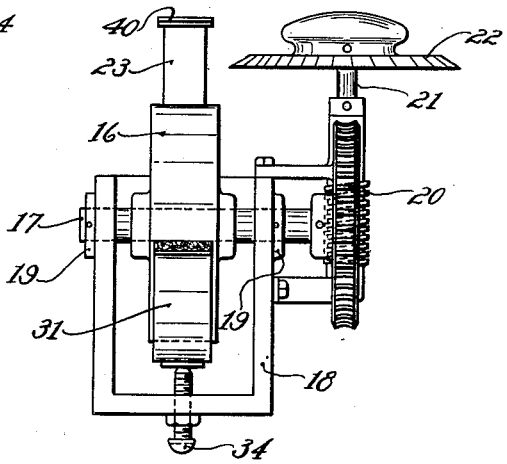
Fig. 2 is a side elevation of the mechanism shown in Fig. 1.

Referring to the drawing, the frequency analyzer to which the present invention has been applied consists of a drum or wheel 16 rigidly secured to a shaft 17 which turns in bearings in side frame members 18. Collars 19 are affixed to the shaft 17 to prevent any end motion thereof. The drum is turned by a worm gear connection 20 with a shaft 21 having a suitable dial 22 by which readings may be taken.

Affixed to and partially wound upon the periphery of the drum 16 is a normally straight reed 23, formed of resilient material, preferably spring steel. That portion of the reed which is free is the active part, while that part of the reed which is wound on the drum is completely inactive as far as any vibration is concerned. The free portion of the reed takes a direction tangent to the periphery of the drum due to its inherent tendency to assume its normally straight condition. The drum end 24 of the reed is securely fastened to the drum as by brazing, whereby the reed moves positively with the drum as it is rotated, and is preferably beveled as shown. The point of tangency between the reed and drum and therefore the point of fixture as far as any transverse vibration of the reed is concerned is determined by a polished lug 25 which presses tightly enough on the periphery of the drum 16 to prevent any chattering at that point. The lug 25 is mounted upon a stiff flat spring 26 which is secured to the end frame member 27. The spring 26 is made of bronze having substantially the same thermal expansion coefficient as the side frame members. The spring 26 is parallel to the free portion of the reed so that the pressure of the lug is always normal to the drum. It will be seen, therefore, that the point of tangency of the reed is fixed. The amount of pressure exerted by the lug 25 upon the reed is regulated by an adjusting screw 28 mounted in the frame.

When the free portion of the reed is to be shortened, the drum 16 is turned in a counter-clockwise direction whence the reed is wound on the drum. Conversely, to lengthen the free portion of the reed, the drum is turned in a clockwise direction. Since considerable friction exists between the reed and the lug 25, the reed tends to push away from the drum between the point where it is fastened thereto and the lug. This would prevent a given angular motion of the drum corresponding to a definite elongation of the free portion of the reed. To prevent this, I make use of a pad of some material such as soft leather or felt. This pad 30 is affixed to a curved backing member 31 preferably made of spring bronze and so proportioned that it extends from a point on the periphery of the drum in close adjacency to the lug 25 to a point about half way around said drum. The necessary peripheral extent of the pad is determined by the amount of reed to be wound upon the drum when the free portion of said reed is in its shortest adjustment. In the present instance it is convenient to use an angular motion of about 180 degrees. The curved member 31 is held in position by being fixed rigidly to a flat tangentially disposed spring member 32 which is affixed to a rigid post 33 mounted on the frame. This construction prevents any angular motion of the pad as the drum is turned. The pressure of the pad 30 is regulated by an adjusting screw 34 which passes through the frame. This pressure is made sufficiently great to prevent any buckling of the wound portion of the reed. Should any buckling occur when the reed is extruded it will be evidenced by the fact that a given constant frequency will cause maximum deflection of the reed at one angular position of the drum when the reed is being elongated and at another angular position of the drum when the reed is being shortened. Proper adjustment of the screws 28 and 34 results in a high degree of constancy of calibration regardless of whether the reed is being lengthened or shortened. There is one and only one resonance point. To obtain this result, it is of course necessary to have no play or back-lash in any of the moving parts and to use a relatively massive and rigid frame. The pad 30 also serves to damp the wound portion of the reed and the drum.

The reed is energized by a coil 35 having a soft iron core 36 fastened to one pole of the permanent magnet 37 which is affixed to the frame. The end of the pole piece 36 is distant from the flat side of the reed by an amount sufficient to prevent the reed striking it when vibrating and sufficiently close to the lug 25 to permit the alternating magneting field to affect the reed when the latter is used at its shortest position. An alternating current having the frequency to be analyzed is impressed upon the coil 35 in any desired way. For example, a sound wave may be picked up by a microphone which controls an amplifier. The output of the amplifier is connected to the coil 35. If the vibration is mechanical and of sufficient intensity the reed may be caused to oscillate without using the coil 35, merely by resting the casing of the device against the vibrating body.

In the operation of this type of frequency analyzer it is necessary to observe visually the vibration of the end of the reed in order to determine the adjustment of the drum which gives the maximum amplitude of oscillation for the particular frequency being impressed. The point of maximum oscillation is difficult to determine visually, since it depends upon visual measurement of the width of the band apparently formed by the rapidly oscillating end of the reed due to the phenomenon of persistance of vision. In accordance with the present invention a visual tip or indicator for the reed has been produced which greatly increases the accuracy of the reading by substituting for the visual observation of a width the much easier visual observations of a position. This indicator has been shown in two forms.

Figure 3:
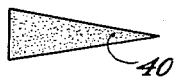
Fig. 3 is a detail of one form of visual indicator for the reed.
Figure 4:
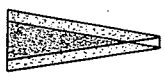
Figs. 4 and 5 are views showing the manner of use of the indicator.
Figure 5:
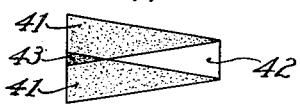

In the form shown in Figs. 3, 4, and 5, the tip 40 is triangular in form, with its median line along the end of the reed. The oscillation of the reed thus shifts the triangle lateraly parallel to its base. In its oscillation the triangle comes to rest at each end of its swing, and travels rapidly at an intermediate point. The visual effect will be that of two overlapping triangles 41 joined by a lighter triangle in the region where the tip is seen only in motion. There is also a triangle 43 where the two triangles of rest overlap, which is the most prominent portion of the pattern. The altitude of this triangle changes very rapidly in proportion to a change in the magnitude of the swing of the reed, so that its apex gives the effect of a visible point approaching the base of the triangle until resonance is reached and then receding from it. This rectilinear motion is much easier to follow than is the constant comparison of the width of the rectangular band made by the vibration of a rectangular tip. So accurate is it possible to detect the resonance point by this means that I have found it possible to determine the frequency of the impressed force to within half a cycle. In the use of this device it is necessary to vary the intensity of the impressed force by suitable controls so that the maximum amplitude of oscillation of the tip will not cause triangle 43 to disappear.

Figure 6:
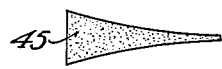
Fig. 6 is a detail of another form of visual indicator.
Figure 8:
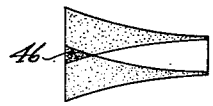
Figs. 7 and 8 are views thereof corresponding to Figs. 4 and 5.
Figure 7:
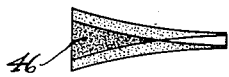

Figs. 6, 7, and 8 show an end tip 45 of a different shape, valuable when it is desired to detect the resonant condition for vibrations of small amplitude. The tip 45 has curved sides so that the triangle 46 formed by the overlapping of the two extreme positions of the tip recedes very rapidly for small changes in amplitude of swing.

While this device has been shown in its application to a frequency indicator having a reed of variable length it has equal application to indicators of the plural reed type, where the readiness with which the amplitude may be measured rather than merely being qualitatively compared lends itself to interpolation between the frequencies shown by a series of reeds of sufficiently close natural periods to be set simultaneously into oscillation by the impressed force. It also finds utility in any environment where the magnitude or point of maximum amplitude of vibration of any rapidly oscillating member is to be observed visually.

What I claim is:

1. A continuously variable tuned ribbon-like reed having a visual tip for determining maximum amplitude of vibration of the reed, said tip being located in a plane substantially perpendicular to the plane of the reed ribbon and having sides converging substantially to a point in a direction at right angles to the direction of vibration imparted to the tip by the reed, and means to vary the natural period of vibration of the reed into resonance with an impressed force.

2. A continuously variable tuned ribbon-like reed having a visual tip for determining maximum amplitude of vibration of the reed, said tip being located in a plane substantially perpendicular to the plane of the reed ribbon and having incurved sides converging substantially to a point in a direction at right angles to the direction of vibration imparted to the tip by the reed, and means to vary the natural period of vibration of the reed into resonance with an impressed force.

3. A continuously variable tuned ribbon-like reed having a visual indicator for determining maximum amplitude of vibration of the reed, said indicator having the form of an isosceles triangle located on the reed at its free end and perpendicular to the plane of the reed ribbon with the base of the triangle parallel with the direction of vibration imparted to the indicator by the reed, and means to vary the natural period of vibration of the reed into resonance with an impressed force.

ROLAND B. BOURNE.